April 16, 1929.  J. B. FIELDER  1,709,716
WELDING CLAMP
Filed Sept. 27, 1927
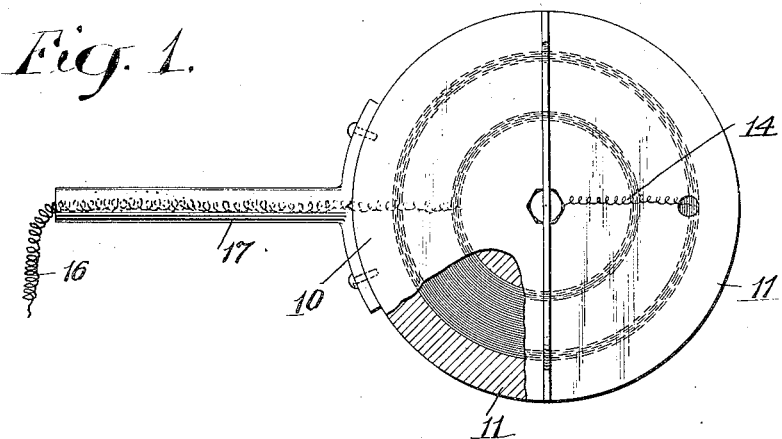
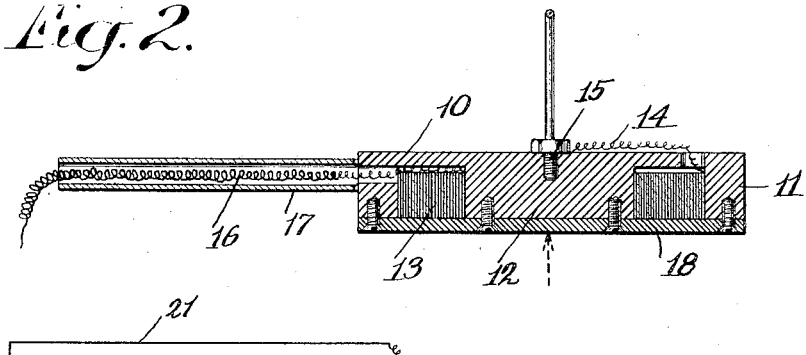
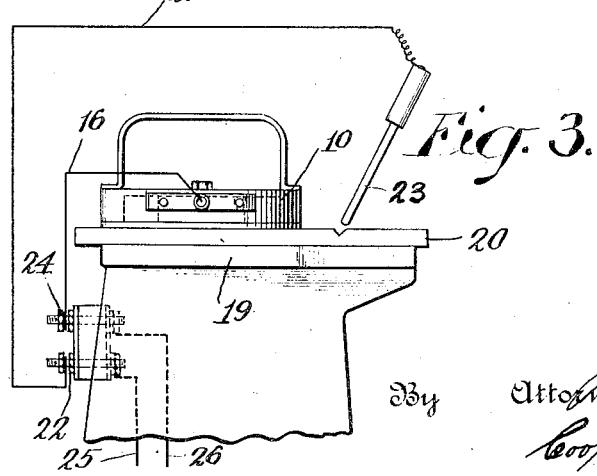
Inventor
John B. Fielder
By Attorney
Cooper, Kerr & Dunham Patented Apr. 16, 1929.

1,709,716

UNITED STATES PATENT OFFICE.

JOHN B. FIELDER, OF DANSVILLE, NEW YORK.

WELDING CLAMP.

Application filed September 27, 1927. Serial No. 222,275.

This invention relates to improvements in clamps for welding machines.

In the electric arc welding machine art it is the practice to clamp the work mechanically to the bed of the welding machine and this clamp has connected to it the ground lead of the welding machine. The clamping of the article to be welded to the machine requires considerable time and difficulty is experienced in securing a proper electrical contact between the clamp and the work to be welded. Furthermore, the clamp itself requires frequent cleaning and resurfacing to provide a good electrical contact with the work.

The present invention is directed to the provision of an improved clamping means for a welding machine to the general end that hand clamping or bolting operations may be obviated, and further to provide a better electrical contact between the clamp and the work to be welded.

According to the present invention a magnetic clamp is provided which is disposed in the welding circuit in such a manner that the clamp itself will be magnetized by the flow of the welding current therethrough upon striking the arc during a welding operation to firmly magnetically clamp the article to be welded to the machine supporting part or base. The circuit is made through a highly conductive surface of the clamp itself whereby a good electrical contact is secured.

In the drawings:

Fig. 1 is a top plan (part sectional) view of the clamp.

Fig. 2 is a central sectional view.

Fig. 3 shows the complete clamp in position and cooperating with the work upon a welding machine and properly connected in circuit therein.

In more detail, the clamp preferably comprises a disc body portion 10 preferably of highly magnetizable iron and having an annular flange portion 11 and a central core portion 12. Between the flange and the core is disposed a magnet winding 13 preferably formed of a spiral copper strip with the convolutions suitably insulated from each other and from the welding clamp body. Insulation may be effected by enamel or in any other desired manner. One end of the strip is electrically, in any desired way or by a wire 14, connected to a stud 15 secured in the body. The other end of the strip or winding 13 is electrically connected to a wire 16 which is of proper length to connect to the ground terminal of the welding machine. Preferably this lead comes out through the interior of a hollow tubular handle 17 which is fastened to the edge of the disc as shown in Figs. 1 and 2.

To provide a good electrical contact surface a disc of copper 18 is fastened to the open side of the body portion and secured thereto by the screws shown in Fig. 2. The clamp may be provided with a bail type of handle which can be secured to the disc like body portion in any manner as by welding the same thereto.

The manner of use of my improved clamp will be readily understood from Fig. 3. Here 19 represents the bed of the welding machine 20 in the work to be welded which is merely laid upon the bed. Upon top of the work piece 20, the welding machine operator places the clamp. 21 is the welding lead which, at one end, connects to the terminal 22 and which at the other end connects to the arc welding rod 23. Flexible lead 16 connects to the ground terminal 24. 25 and 26 are the current supply means.

After merely laying the clamp upon the work piece, the welding operator strikes the arc, whereupon a circuit is established from terminal 22 through the electrode 23, through the work 20, thence to the copper plate 18 and through the body 10 of the clamp, wire 14, magnet coil 13, wire 16 and back to the ground terminal 24. The flow of welding current energizes the magnet coil 13 and magnetizes the clamp whereby it is attracted toward the bed 19 of the welding machine thereby firmly clamping the work piece 20 to the bed. If in addition, the work piece is of iron or like magnetizable material the clamp will be attracted toward the work piece as well as towards the bed of the machine. In either event the work piece will be held firmly upon the bed of the machine. Good electrical contact between the work and the clamp is also secured by reason of the copper plate 18 being in direct contact with the work and being in itself a good electrical conductor.

The aforesaid clamp is therefore, wholly automatic in its action. The work piece is held firmly to the bed so long as the arc is being struck. Removal of the clamp and work piece may be effected without effecting unbolting of a mechanical clamp member or members as heretofore, and such removal is readily effected after the clamp is demagnetized upon the interruption of the arc.

What I claim is:

1. A clamp for a welding machine, said clamp having a portion thereof of magnetizable material, a magnet winding in association with said portion, a lead from said winding adapted for connection to the ground terminal of a welding machine, and electrical connections from said winding to a work piece, whereby the clamp will be magnetized upon flow of current to the winding from the work piece and demagnetized upon the interruption of the flow of current to said work piece.

2. The invention set forth in claim 1 in which a hollow tubular handle is provided through which a lead to the magnet winding extends.

3. A welding machine clamp adapted for clamping work in a welding machine employing an electrode, said clamp comprising a magnetizable body portion, and a magnet for energizing the same, a magnet circuit including said magnet and the welding electrode so that the circuit is completed or interrupted by the welding electrode itself in striking an arc or in breaking the arc whereby clamping action is automatically initiated or terminated by the initiation or termination of the welding operation itself.

4. A clamp for a welding machine including a magnetizable portion, a magnet winding associated with the clamp for magnetizing said portion, said magnet being disposed in a circuit of the welding machine through which welding current flows to the work to be welded so that the said circuit is automatically established and the aforesaid magnet energized upon striking an arc in welding.

5. A clamp for a welding machine including a surface plate of highly conductive material, a body portion of magnetizable material supporting said surface plate, a magnet winding carried by said body portion and adapted to magnetize the same, electrical connections from said plate to said winding, a welding electrode, and other electrical connections from said winding to said electrode through which current flow is automatically established when a welding is struck whereby the magnet is automatically energized, said connections also automatically affording an interruption of current flow to the winding by and upon the interrupting of the welding operation by the electrode.

6. A welding machine clamp comprising an annular magnetizable disk with an annular opening therein, a magnet winding disposed in said annular opening, and a high electrically conductive facing disk disposed over the winding and secured to said disk and adapted to retain and protect said magnet winding, and electrical connections to and from said winding for supplying current thereto.

7. A clamp for a welding machine including in combination, a magnetizable body portion, a contact surface carried thereby and adapted to establish electrical contact with the work to be welded, a magnet winding associated with the body portion, a welding circuit from said magnet winding to the contact surface member, and from the magnet winding to an electrode through which current flow is automatically established upon striking an arc whereby the magnet is energized to magnetize the body portion and both clamp the work to be welded and to establish and maintain a firm contact between the aforesaid contact surface and the work to be welded.

8. A clamp for a welding machine including a magnet winding associated with the clamp for attracting the clamp to the work upon the energization of the winding, and means for automatically energizing said magnet and attracting the clamp by and upon the striking of a weld.

9. A clamp for a welding machine for clamping the work to be welded in place, a magnet winding for magnetizing the clamp, and a welding circuit to and from said winding through which welding current flow is automatically initiated upon striking an arc and through which current flow is automatically cut off upon breaking the arc for the purpose described.

In testimony whereof I hereto affix my signature.

JOHN B. FIELDER.